United States Patent
Svedenkrans

(10) Patent No.: US 6,333,819 B1
(45) Date of Patent: Dec. 25, 2001

(54) DISPLAY FOR HEAD MOUNTING

(75) Inventor: Göte Sigvard Svedenkrans, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/567,650

(22) Filed: May 9, 2000

(30) Foreign Application Priority Data

May 26, 1999 (SE) .................................................. 9901907

(51) Int. Cl.[7] .................................................. G02B 27/14
(52) U.S. Cl. .......................... 359/631; 359/630; 359/632; 359/634
(58) Field of Search ..................................... 359/631, 630, 359/632, 634, 638, 640, 639, 831, 832, 833, 834, 835, 836, 837

(56) References Cited

U.S. PATENT DOCUMENTS

| 5,596,451 | 1/1997 | Handschy et al. |
| 5,619,373 | 4/1997 | Meyerhofer et al. |
| 5,644,432 | * 7/1997 | Doany .................................. 359/634 |
| 5,808,800 | 9/1998 | Handschy et al. |
| 6,204,975 | * 3/2001 | Watters et al. ........................ 359/633 |

FOREIGN PATENT DOCUMENTS

| 4240884 | 6/1993 | (DE) . |
| 222892 | 3/1990 | (GB) . |

* cited by examiner

*Primary Examiner*—Georgia Epps
*Assistant Examiner*—John J. Magee
(74) *Attorney, Agent, or Firm*—Burns, Doane, Swecker & Mathis, L.L.P.

(57) ABSTRACT

In order to visualize an active matrix liquid crystal image generator, it is illuminated in a prism system by a light source and a collimator directing light into the prism system and made linear polarized and reflected by a first half-mirror layer between two joined prism surfaces, the image generator differentially twisting pixelwise the polarization plane of reflected light therefrom, such that twisted light can traverse the first half-mirror layer and a second half-mirror layer for focusing by a concave mirrors, the second half-mirror then directing a virtual image toward an eye location, from which a natural scene may also be viewed. The prism system, as seen in a plan perpendicular to the viewing direction, includes two isosceles prisms and one of trapezium section, or preferably that of a parallelogram.

4 Claims, 2 Drawing Sheets

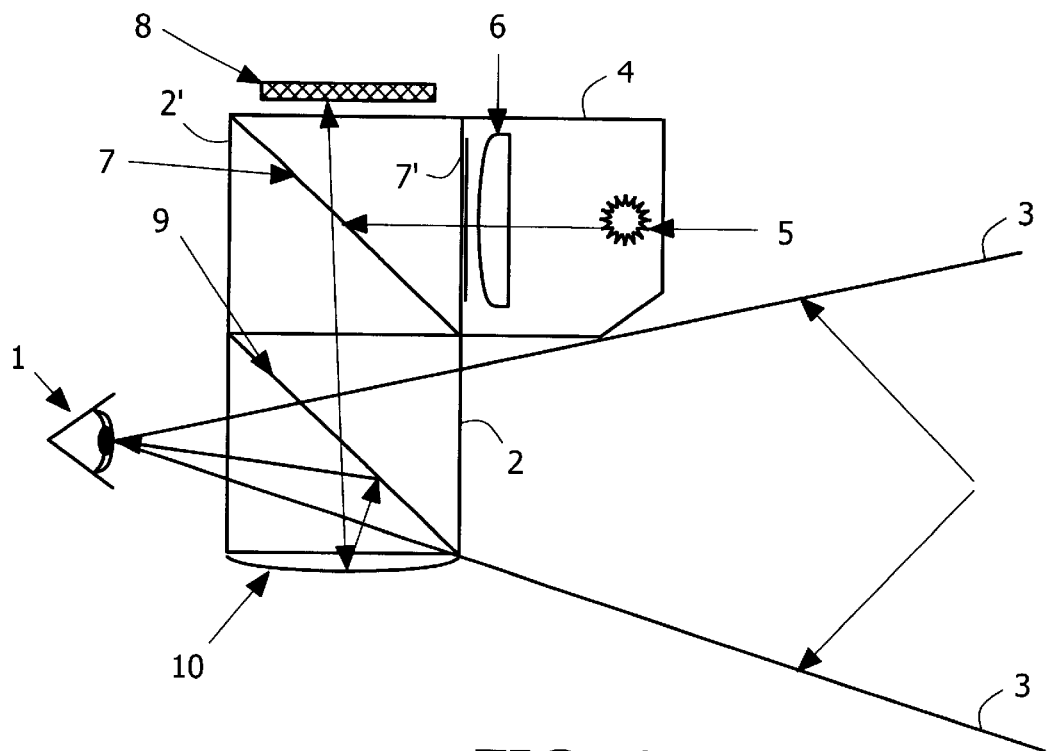
FIG. 1
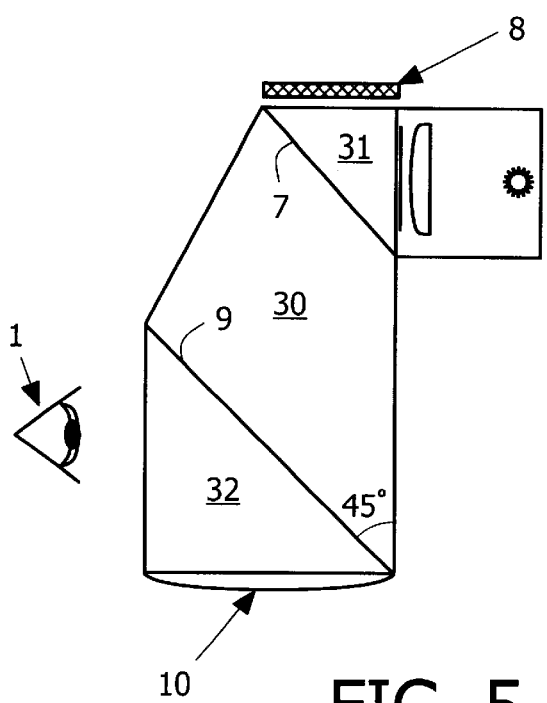
FIG. 4
FIG. 5

DISPLAY FOR HEAD MOUNTING

BACKGROUND

The invention regards generally displays of the type where an image is created, normally electrically and pixel by pixel, and is brought to a viewable image, preferably a virtual image, which can be combined with a real image, for instance a scene.

A display of this type is known from U.S. Pat. No. 5,596,451, the contents of which are hereby declared as included by reference in the present disclosure. An active matrix liquid crystal matrix of the type marketed by Displaytech, Inc., Boulder, Colo., USA may have a very high number of pixels on a small chip, and the pixels change their polarization of reflected light. Such a matrix is mounted in a glass prism system with an illumination device, which directs polarized light toward the matrix. The light reflected from the matrix will then have its pixels reflect the polarized light with the same or a different polarization state, depending on the pixel being in one or the other of two states of electrical activation, and the image created by the settings of the pixels is projected via polarization means for eliminating radiation having one of the polarization states, toward the eye of an observer, may then be seen as a virtual image at a distance, eventually also together with a natural scene, creating an effect roughly corresponding to that of a HUD (Head Up Display).

In this patent and in U.S. Pat. No. 5,808,800 are shown displays for head mounting of the type comprising an active matrix liquid crystal image generator, an illumination device for illuminating the said image generator and optical means for projecting an image generated by the image generator toward an exit pupil at an eye location for viewing by an eye together with an eventual natural scene in front of the eye emplacement, said optical means comprising prisms forming two mutually parallel beam splitters, each formed by the jointure of two prism surfaces in a beam splitter layer, a first one of said beam splitters reflecting light from said illumination device to illuminate said image generator, a spherical mirror imaging said illuminated image generator by reflecting light from said image generator traversing said first beam splitter and said second beam splitter, said second beam splitter reflecting light reflected by said spherical mirror toward said eye location.

In this known system (U.S. Pat. No. 5,596,451), there are used two cubes (or at least having square sections), both consisting of right isosceles prisms joined at their hypotenuse faces, forming polarizing half-mirror layers in between. A first of the cubes has the matrix laid on one cube side, and its polarizing half-mirror is used for illuminating the matrix. The matrix is imaged through the half-mirror and into the second cube through its half-mirror layer and a λ-quarter layer (converting the light to circular polarization) up to a planoconvex mirror laid flat against the cube. The reflected rays (with opposite circular polarization) will be linear polarized but in a perpendicular direction in relation to the light coming from the first cube, when returning through the λ-quarter layer. The polarizing half-mirror layer in the second cube will therefore direct the light toward the eye. Since the eye can also look through the second cube, the image and the natural scene can be regarded simultaneously. However, the scene can also be removed by a blind or the like, creating also a viewing device usefull e.g. for "virtual reality".

In the examples shown in U.S. Pat. No. 5,596,451, the first cube carrying the display matrix is smaller than the second cube, which is also used for viewing through. Lately, the matrixes have increased in size and number of pixels, so that devices with 1280×1024 pixels can now be obtained, the chip having a size of 16×13 mm in total. Also, it is advantageous to make the second cube as small as is consistent with demands for eye relief. The general construction could then evolve toward a system as shown in FIG. 1, which is different from the said prior art.

SUMMARY

It is an object of the present invention to obtain a display of the indicated type, for imaging a light reflecting type spatial light modulator and which is as light as possible and which has a large and undisturbed field of vision, in particular as to the direct vision aspect. Another object is to obtain a display which can combine for viewing a display device which is larger than has been used earlier. A further object is to avoid ghost images. In presently preferred constructions, the spatial light modulator is an active matrix liquid crystal image generator, but the invention is not limited to only this type of image generator.

Those objects and other objects and advantages which will appear from the following description, are obtained according to the present invention by means of a display of the kind recited, wherein said optical means comprising a first prism, a second prism and a third prism, said first and third prisms having right isosceles triangular sections in a plane perpendicular to said beam splitters, the hypotenuses thereof forming each one surface in each of said beam splitter layers, and the second prism having in the said plane a trapezium section. In a preferred embodiment, the second prism has a higher symmetry, being a parallelogram the acute angles of which are 45 degrees. The right isosceles prisms will then be equal, making the composite prism have a section with the same outer section form as two adjoining squares, but made of only three prisms.

In a preferred embodiment, the illumination device is multicolored, preferably by projecting three colors, and also preferably in succession, the image of the active matrix switching into images provided for each of those colors. The change is made sufficiently fast to present a blink free multicolor image.

BRIEF DESCRIPTION OF THE DRAWINGS

The invention shall now be described by reference to a non-limiting embodiment.

FIG. 1 shows a sectional view of a display, which is modified from the prior art toward the invention.

FIG. 4 shows a particular light source.

FIG. 5 shows schematically a corresponding section through a different embodiment of the invention.

DETAILED DESCRIPTION OF THE EMBODIMENTS

Figure 2:
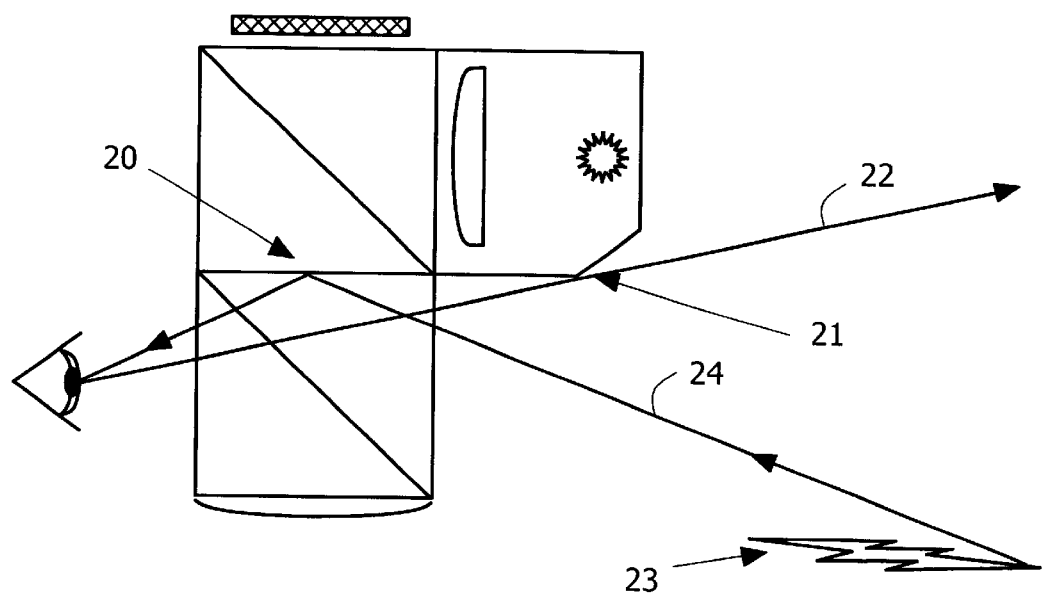
FIG. 2 shows some disadvantages with the FIG. 1 construction.

FIG. 1 shows a schematic sectional view through a display which, like the prior art, has a prism system consisting of two "cubes" split by beam splitter layers, but in this drawing, the "cubes" are of equal size. (They do not have to be cubes but should have square sections and will be called cubes in the following for simplicity.)

The device is mounted before a schematically drawn eye, which regards a view through the lower cube, the outermost rays being designated 3. Above is a box 4 containing a light source 5 and a collimator lens 6, which will send substantially collimated light into the upper cube 2' to be reflected by the first beam splitter 7. In order for the display 8 to receive polarized light, the layer 7 may have a polarizing effect above that determined by Fresnel's law, and/or a prepolarizator 7' may be mounted after the collimating lens.

The active matrix comprising a multitude of pixel surfaces, may be exemplified as a commercially obtainable device (Displaytech Inc., Boulder, Colo.). With this particular device type, the pixel surfaces have the property that they can be electrically activated to twist the polarization plane of incoming light into reflected light at 90° angle thereto. Such reflected light which has been twisted will pass through layer 7, whereas such light which has not been twisted will be reflected back by the layer 7. The light, the polarization plane of which was twisted by the matrix pixels will also pass through layer 9 in the lower cube, the underside of which is provided with a planoconvex lens 10, the convex side of which is metallized into a mirror, and in sandwich therewith a $\lambda/4$ plate. The $\lambda/4$ plate will make the line-polarized incoming light into circularly polarized light, which when reflected will change its rotation direction, and after going back through the $\lambda/4$ plate will return to line polarized, although now twisted by 90°. Due to the polarization properties, the layer 9 will now not be penetrated by this light from the mirror but will be reflected toward the eye, and will form a virtual image in front of the device, to be viewable together with the scene in front without too much accommodation. The mirror lens may be of another glass, in order to give some achromatization. The general principle as to these polarizations and separations is known from the above-mentioned patent.

The construction in FIG. 1 has been motivated by the increase in the size of active matrix liquid crystal image generators, making it necessary to use cubes of the same size, but this creates some severe difficulties, which are demonstrated in FIG. 2. First, the construction with two cubes inevitably creates a joining plane 20 between them, and it is practically impossible to make this joining plane free of reflexion. Such a reflexion may make an object like 23 appear through rays 24 mirrored in layer 20 which will reach the eye and form a ghost image. Second, the light box will create a marked obstacle 21 to the field of vision, creating the limit ray 22.

Figure 3:
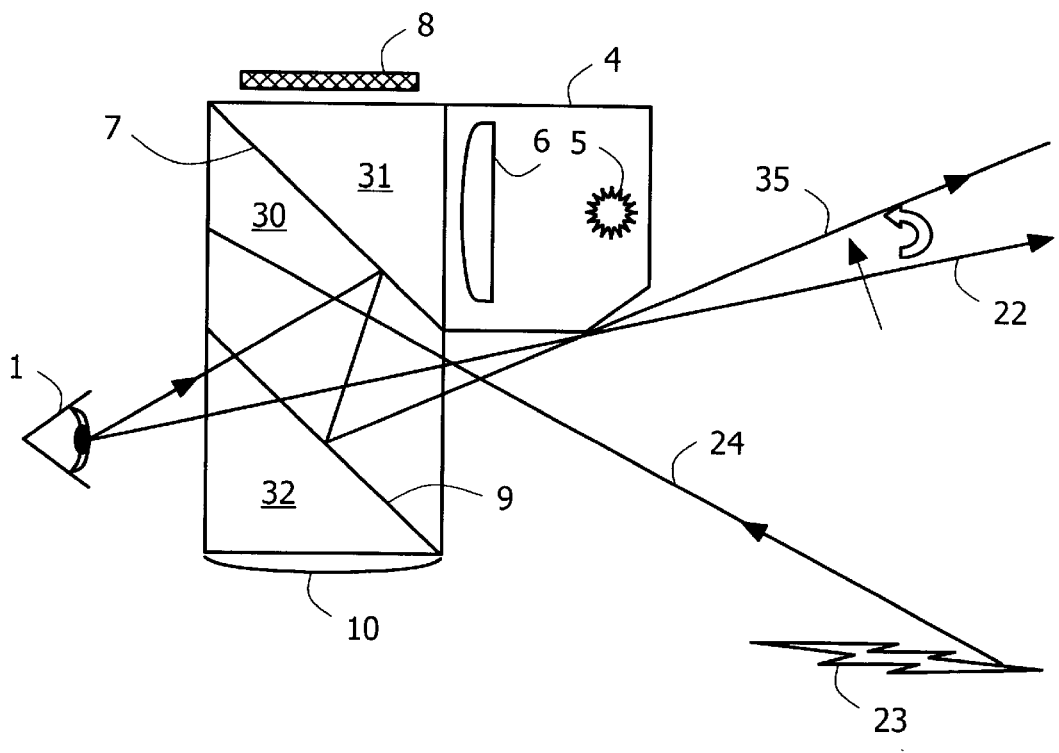
FIG. 3 shows a section through an embodiment of the invention.

According to the present invention, therefore, the prism geometry is modified in a way exemplified in FIG. 3. Instead of a prism set of two split cubes 2, 2' (FIG. 1), the glass packet comprises three prisms in combination. One prism 30 has the section form of a parallelogram, the acute angles of which are 45°. Two other prisms 31 and 32 have sections of right isosceles triangles. Together, they form an outer form similar to that of FIGS. 1 and 2, but the joining surface 20 (FIG. 2) is eliminated. The right isosceles prisms 31 and 32 are joined to the long parallel surfaces of the parallelogram prism, sandwiching layers 7 and 9 respectively. As apparent from FIG. 3, the elimination of joining surface 20 (FIG. 2) will eliminate the reflection of rays like 24 from being mirrored into the eye, and the ghost image of ground phenomenon 23 will be eliminated. Further, the field of view will be increased by a new limiting ray 35 farther out than old limit 22. The light of this field will reach the eye through two reflections, in layer 9 and layer 7 respectively, and in practice, this part of the field has shown out to be very acceptable, being a periscope effect working well at infinity and attenuated to some 25%.

EXAMPLE

A device according to FIG. 3 has been constructed, being formed out of two units to be carried like spectacles. The total weight of glass was 75 g per eye. Each glass prism unit was 25 mm wide, had a depth in the direction of vision of 20 mm and a height of 45 mm. The prism configurations were as in FIG. 3, the layers 7 and 9 (FIG. 3) being provided with appropriate layers (e.g. MSOD). For the image of the image generator, the output pupil was 23 mm wide and 13 mm high. The eye relief was 25 mm. The chips 8 with the matrixes were 16×13 mm and contained 1280×1024 pixels. The light sources in the boxes were surfaces 14×8 mm composed of arrays of light emitting diodes of three colors mixed over the surfaces and which could be lighted in succession with a frequency of 60 Hz, the images delivered to the array being in correspondence. Such an array of multicolor sources is shown schematically in FIG. 4, where three different colors are symbolized by signs o, x and +. This combination, with one unit per eye mounted in a spectacle frame, thus quite capable of making virtual reality in full stereo, possibly closing the direct vision and looking only at the image from the image generator.

In FIG. 5 is shown another geometric form of the invention, where the section of the third prism 30 has another form with a lower symmetry than that of a parallelogram namely, a trapezium. Such a quadrangle as shown in FIG. 5 has two opposite sides which are mutually parallel, but the other two sides are not parallel. In order to obtain a good view of the scene in front, it is preferred to have the acute angle at the bottom at 45 degrees, as shown. Thus, as compared to the prior art, it is important that there are no two cubes joined by an intermediate materialized and reflective plane. The example of FIG. 5 is thus calculated to demonstrate that the elimination of this joining plane can be obtained even if the half-mirror surfaces 7 and 8 are not equal. Slight retouches may be desirable in order to place the image from array 8 in the center of the scene viewed, for instance by adding a thin wedge between the lens 10 and the prism 32 (not shown)

The man of the art will directly think of many modifications of the present invention, and it is the intention that the appended claims, read against the background of the description, shall cover any and all of them.

What is claimed is:

1. A display for head mounting comprising a light reflecting type spatial light modulator, an illumination device for illuminating the said image generator and optical means for projecting an image generated by the image generator toward an exit pupil at an eye location for viewing by an eye together with an eventual natural scene in front of the eye emplacement;

wherein said optical means comprises prisms forming two beam splitters, each beam splitter formed by the intersection of two prism surfaces, a first one of said beam splitters reflecting light from said illumination device to illuminate said image generator, a spherical mirror imaging said illuminated image generator by reflecting light from said image generator traversing said first beam splitter and a second beam splitter, said second beam splitter reflecting light reflected by said spherical mirror toward said eye location; and wherein said optical means comprises a first prism, a second prism and a third prism, first and third prisms having right isosceles triangular sections in a plane perpendicular to said beam splitters, the hypotenuses thereof forming each one surface in each of said beam splitter layers, and the second prism having in the said plane a trapezium section.

2. A display according to claim 1, wherein said second prism is a parallelogram, the acute angles of which are 45 degrees, said first and third prisms having equal sections in the said plane.

3. A display according to claim 1, wherein said illumination device comprises a light source and a collimator arranged to project light into a catheter surface of said first prism, said image generator being arranged at the other catheter surface thereof, said light source comprising a multitude of light emitting diodes each capable where enabled to emit a specific one of a plurality of colors, said diodes distributed in a matrix surface for separate and successive enablement of diodes radiating in each of said plurality of colors.

4. A display according to claim 3, wherein the said plurality is three and by comprising means for enabling the diodes of each color in succession and in pace with different color images from said image generator, with a speed compatible with eye inertia for elimination of twinkling.

* * * * *